Jan. 7, 1969  D. E. KELLY ET AL  3,420,579
VACUUM OPERATED BRAKE SYSTEM
Filed May 3, 1967
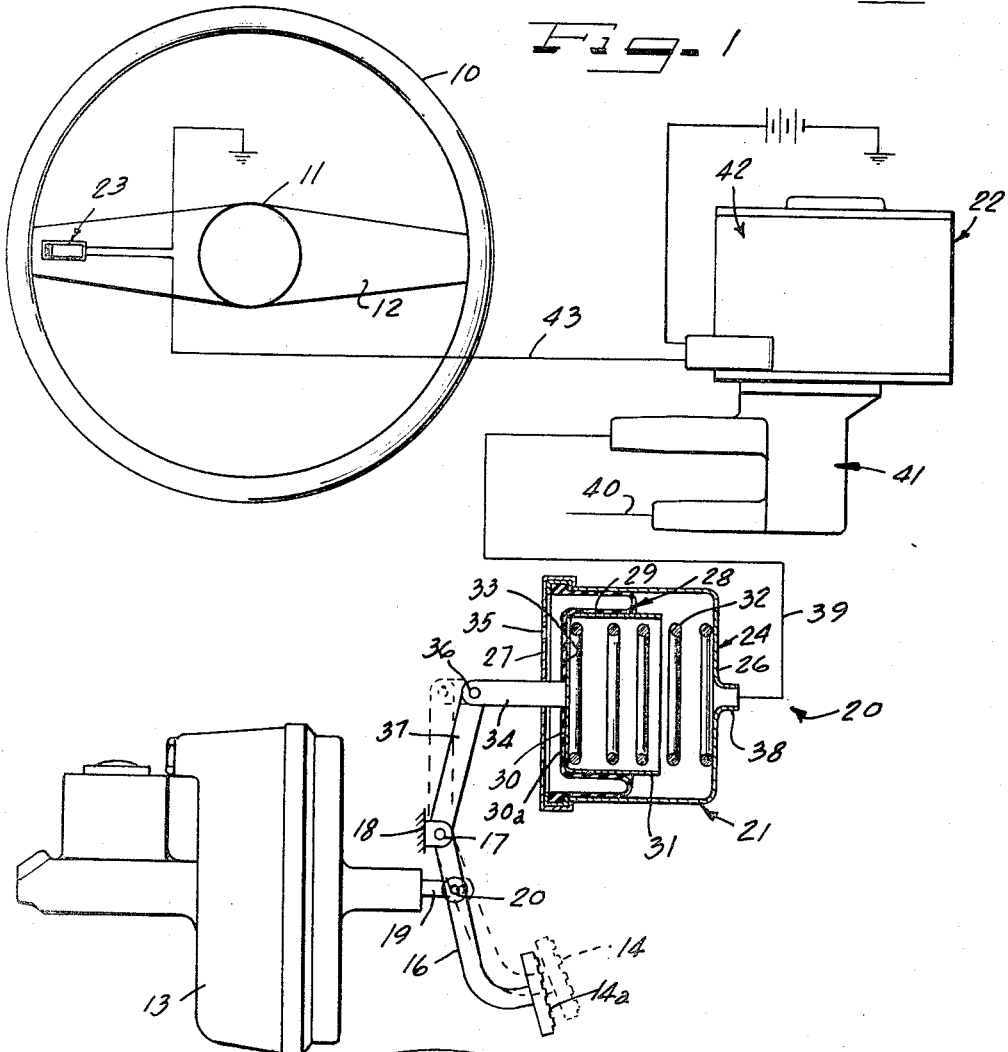
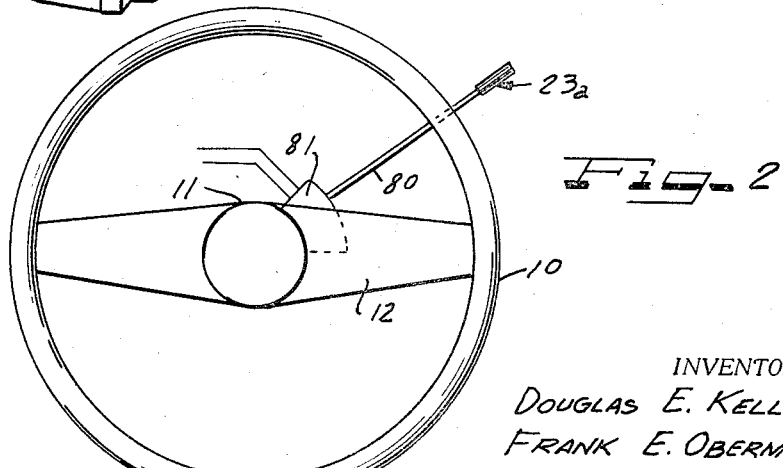
INVENTORS
DOUGLAS E. KELLY
FRANK E. OBERMAIER
ATTORNEYS

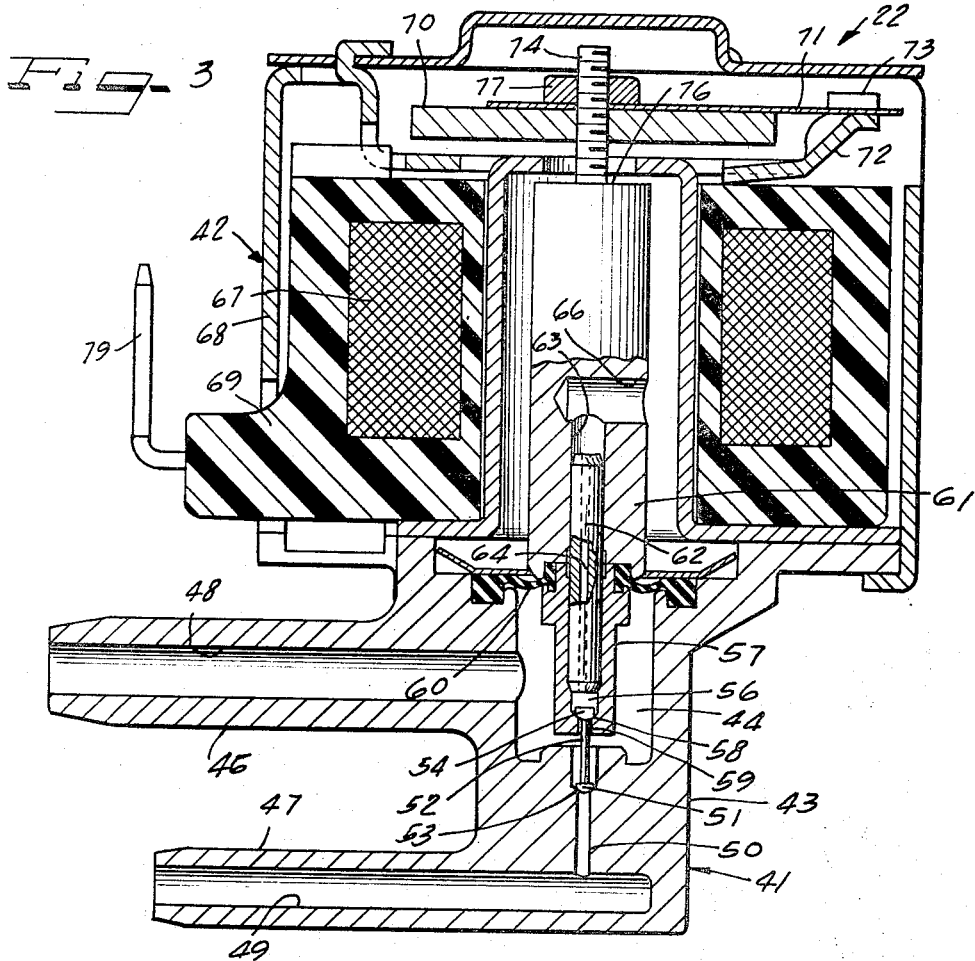
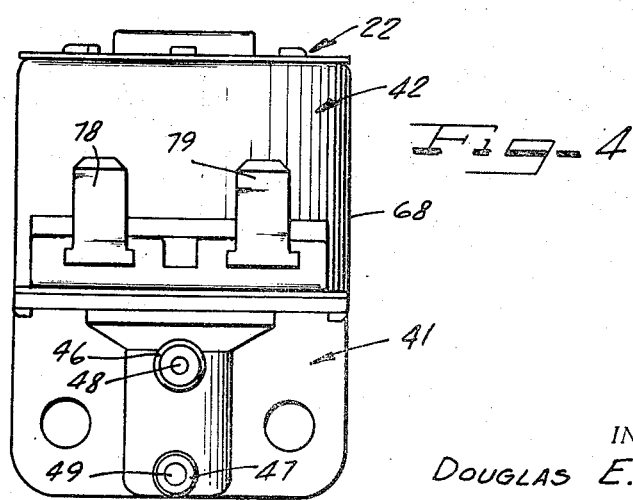

United States Patent Office 3,420,579
Patented Jan. 7, 1969

3,420,579
VACUUM OPERATED BRAKE SYSTEM
Douglas E. Kelly, Northfield, and Frank E. Obermaier,
Park Ridge, Ill., assignors to The Dole Valve Company,
Morton Grove, Ill., a corporation of Illinois
Filed May 3, 1967, Ser. No. 635,786
U.S. Cl. 303—13                           7 Claims
Int. Cl. B60t 15/16; B60t 17/02

ABSTRACT OF THE DISCLOSURE

A vacuum operated brake system for use as an auxiliary braking system in a vehicle having the usual brake foot pedal. A vacuum motor is connected to the vacuum system of the vehicle engine through a transducer which includes a vacuum modulator to vary the level of vacuum applied to the vacuum motor and an electric solenoid for controlling the operation of the vacuum modulator. The vacuum motor includes a power take-off for connection to the brake pedal to move the pedal in accordance with the amount of current passing through the solenoid. A manually operated rheostat is electrically connected to the solenoid for varying the amount of current to the solenoid and is adapted to be located in the vehicle in proximity to the vehicle operator, for example, on the steering wheel or column, for hand operation.

Background of the invention

This invention relates generally to vehicular braking systems and more particularly to a vacuum operated brake system for use as an auxiliary system in those classes of vehicles having the usual depressible brake foot pedal.

In many types of vehicles and in many kinds of driving conditions the availability of a hand-operated braking system is desirable, not only as a matter of convenience, but in some circumstances as a matter of conferring upon the operator of the vehicle the ability to more quickly respond to changing driving and braking conditions.

In connection with some vehicles such as automobiles the provision of the usual brake foot pedal is highly desirable, but nevertheless the added availability of a hand-operated brake control is exceedingly meritorious. Situations perhaps most conducive to the use of a hand control are highway driving and the stop-and-go driving necessitated at times in heavy traffic conditions.

Most of the automobiles of current design incorporate hydraulic brake systems and one apparent method of adding an auxiliary hand-operated control to such systems would involve the tying in of the auxiliary system directly into the existing hydraulic system. Such arrangements have been suggested but in the opinion of many are not particularly desirable since they may offer additional potential areas of failure of the hydraulic systems.

The present invention is directed primarily to the problem of providing an auxiliary hand-operated braking system for realizing all of the advantages inherent in such systems without sacrificing any of the trustworthiness of the main foot pedal operated braking system, while minimizing costs of manufacture and installation and maximizing convenience in operation.

Summary of the invention

The present invention involves an auxiliary hand-operated braking system connected as an adjunct to a conventional hydraulic foot-pedal operated braking system without hydraulically or pneumatically tying in to the main system, and thus avoiding the corollary possibility of introducing new areas of potential failure.

The braking system of this invention effects braking by operating the foot pedal of the main braking system in a manner similar to the usual foot actuation thereof.

According to the principles of this invention a vacuum powered motor which includes a mechanical linkage movable in response to variations in vacuum to which the vacuum motor is subjected is adapted for mechanical connection to the brake pedal. A vacuum modulator of an electro-mechanical transducer is connected into the manifold vacuum system of the engine of the vehicle and is further connected to the vacuum motor for varying the level of vacuum working on the vacuum motor. An electrically operable mechanism is operatively connected to vacuum modulator for regulation thereof and an electric circuit connected to the electrically operable means includes a hand operated control member for varying the electric power supply to the electrically operable mechanism and consequently for varying the level of vacuum working on the vacuum motor. Thus as a consequence of manipulating the hand operated control member the operator of the vehicle effectively controls the braking of the vehicle.

The control member may be located on the vehicle at a point easily accessible to the operator. For example, in the case of an automobile, the control member may be mounted directly on the steering wheel or the steering column, or on a control module or instrument panel or the like.

It is, therefore, an object of the present invention to provide a hand controlled vacuum operated braking system as an adjunct to the usual foot pedal controlled braking system of a vehicle.

Another object is to provide an auxiliary braking system which is not tied in directly with the main braking system except mechanically through the foot pedal, whereby not only is the hydraulic circuitry or the like of the main braking system left undisturbed but whereby the braking system of the present invention is applicable to any type of foot pedal controlled system such as mechanical, hydraulic and "power" brake systems.

Another object of the invention is to utilize a vacuum motor connected into the vacuum manifold of the engine of the vehicle as a source of power for operating the auxiliary braking system.

Another object is to utilize electro-mechanical transducer means for controlling the level of vacuum to the vacuum motor with a minimum of actual physical effort required on the part of the operator of the vehicle.

Another object is to increase the ease of operation of an automobile, particularly during highway driving and in heavy traffic conditions by providing a finger actuated brake control on or about the steering wheel or the steering column.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Brief description of the drawings

FIGURE 1 is a generally schematic showing of an auxiliary hand controlled vacuum operated braking system constructed in accordance with the principles of the present invention and including a vacuum motor directly linked to the brake foot pedal of the vehicle and a brake controller mounted directly on the steering wheel.

FIGURE 2 discloses another embodiment of the hand control mounted on the steering column of the steering wheel.

FIGURE 3 is a vertical sectional view of an electro-mechanical transducer of the present invention taken substantially along lines III—III of FIGURE 4.

FIGURE 4 is a reduced elevational view of the transducer shown in FIGURE 3.

Description of the preferred embodiment

FIGURE 1 illustrates several pertinent parts of a vehicle having the usual foot pedal operated braking system. Reference numeral 10 designates the steering wheel of the vehicle mounted on a steering column 11 through a web 12 of the wheel 10. Reference numeral 13 designates the master cylinder of a conventional hydraulic braking system having a depressible foot pedal movable from a non-braking position indicated in dashed lines at reference numeral 14 to a braking position indicated in solid lines at 14a. The foot pedal 14 is mounted on an arm 16 pivotally mounted at 17 to a stationary member of the vehicle at 18. The arm 16 is linked to a reciprocable actuating rod 19 of the master cylinder 13 through a connecting pin 20.

The hand controlled auxiliary braking system of the present invention is indicated generally at reference numeral 20 and may be more particularly characterized as comprising a vacuum motor 21, an electro-mechanical transducer at 22 and a spring biased thumb actuated brake controller 23 mounted directly on the steering wheel 10.

The purpose of the vacuum motor 21 is to utilize the power available from the vacuum manifold of the engine of the vehicle in reducing the physical effort required on the part of the operator in actuating the brake system 20. The components of the vacuum motor 21 include a housing 24 which is closed at one end 26 and opened to atmosphere at an opposite end 27.

A movable member such as a flexible diaphragm 28 is mounted within the housing 24 and doubles back along itself at 29 such that a center portion 30 thereof is able to move back and forth within the housing in accordance with pressures acting on opposite sides of the diaphragm. A rigid cup-shaped member 31 is secured to the diaphragm wall 30 and houses a coil spring 32 bottomed at opposite ends on a wall member 33 of the cup-shaped member 31 and on the closed end 26 of the housing 24. A rod 34 is mounted in connected assembly to the wall 33 and is pivotally connected by a pivot pin 36 to an extension 37 of the brake arm 16.

One side 30a of the diaphragm 28 is in communication with atmospheric pressure through openings 35 formed in the end 27 of the motor housing 24. A vacuum port 38 is formed in the closed housing wall 26 for communicating the interior of the vacuum motor housing between the wall 26 and the diaphragm 28 with the vacuum manifold of the vehicle engine. Accordingly, a conduit 39 is connected to the port 38 and is also connected to a conduit 40 in communication with the engine vacuum manifold through a vacuum modulator indicated generally at reference numeral 41.

The modulator 41 comprises the lower portion of the electro-mechanical transducer 22, and an upper portion 42 comprises an electrically operable component of the transducer 22 which serves to operate the modulator 41.

In the embodiment illustrated the thumb operated brake controller 23 comprises an electric rheostat connected into an electric circuit 43 in series with the electrically operable component 42 of the transducer 22.

The vacuum modulator 41 mounted between the vacuum manifold and the vacuum motor 21 modulates the level of vacuum being applied to the vacuum motor for controlling the amount of force supplied to the brake pedal 14. In the illustrated embodiment the electrically operable mechanism 42 comprises an electric solenoid for incrementally operating the modulator 41 as a function of the amount of current passing therethrough. The current, in turn, is controlled by the thumb operated rheostat 23 connected in series therewith.

In operation, the operator of the vehicle need only apply finger pressure to the spring biased rheostat 23 to operate the braking system. The rheostat 23 is, of course, biased to a non-braking position and the degree of braking effect is proportional to the amount of finger pressure applied to the rheostat 23. For example, in a non-braking situation the rheostat 23 is completely released. If conditions require a slight braking effect the rhesotat is depressed slightly. Where a greater braking effect is required the rheostat 23 is depressed farther.

Referring to FIGURES 3 and 4, the vacuum modulator 41 is more particularly characterized as comprising a housing 43 having a vacuum chamber 44 formed therein. A pair of conduit connectors 46 and 47 are formed on the housing 43 for receiving conduits 39 and 40 respectively.

A passageway 48 is formed in the conduit connector 46 for direct communication with the vacuum chamber 44, and a passageway 49 is formed in the connector 47 for communication with the chamber 44 through an interconnecting passageway 50.

The level of vacuum between the passageways 48 and 49 is modulated in part by a valve member 51 formed at a lower end of a valve pin 52 and engageable with a valve seat 53 formed in the interconnecting passageway 50. Another valve member 54 is formed at the opposite end of the valve pin 52 and is housed in a chamber 56 formed in a hollow rod or link 57.

The link 57 is housed in the vacuum chamber 44 and the valve member 54 is engageable with a valve seat 58 formed in the bottom of chamber 56. A passage 59 formed in the link 57 receives the valve pin 52 and communicates the chamber 56 with the vacuum chamber 44.

The link 57 is movably mounted on a flexible diaphragm 60 which closes the upper end of the chamber 44. A link extension 61 is also secured to the diaphragm 60 and to the link 57 by means of a roll pin 62 press-fit into the chamber 56 and into a passageway 63 formed in the link extension 61. The passageway 64 formed in the roll pin 62 extends the length thereof for communicating the chamber 56 with atmosphere through the passageway 63 and a transverse passageway 66 formed in the link extension 61.

The electrically operable mechanism 42 of the transducer 43 comprises a solenoid 67 mounted above the modulator 41 in a housing 68. The windings of the coil 67 may be housed in a nylon encapsulator 69 and located above the windings in the path of the lines of flux produced thereby is a sole plate 70 mounted on a cantilever spring 71 which is securely affixed at one end thereof to a rigid flange 72 by means of a fastener as at 73.

A threaded stud 74 projects upwardly from an upper end 76 of the link extension 61 and extends through apertures formed in the sole plate 70 and the spring 71 to receive a complementarily threaded nut 77. Thus the link extension 61 and the link 57 are fixedly connected for joint movement with the spring mounted sole plate 70.

The sole plate 70 as well as the housing 68 are made of suitable material such as magnetic steel, whereas the link and link extension 57 and 61 may preferably be made of nonmagnetic material such as aluminum. The spring 71 is preloaded to bias the link 57 upwardly in opposition to the downward force of the sole plate 70 produced by a current passing through the solenoid 67. A pair of electric contacts 78 and 79 connect the solenoid 67 to the electric circuit 43 (FIGURE 1).

In operation, assuming that the rheostat 23 is positioned such that no current is flowing through the solenoid 67, the preloading of the spring 71 will bias the link 57 upwardly sufficiently such that the valve member 51 rises from its seat 53 sufficient to reduce the pressure in the vacuum chamber 44 to a level at which a downward force on the diaphragm 60 exactly offsets the force of the preloaded spring 71.

For example, assume that the pressure in the vacuum manifold of the engine is at about 25 inches Hg vacuum. Thus a vacuum of 25 inches Hg exists in the passageway 49 of the conduit connector 47.

Further assume the spring 71 is preloaded to bias the link 57 upwardly so as to maintain a pressure of 20 inches Hg vacuum in the vacuum chamber 44. Thus the spring 71 will raise the link 57 to unseat the valve member 51. When the vacuum in chamber 44 acting on the diaphragm 60 is sufficient to balance the force of the spring 71 the link 57 will begin to move downwardly. If the pressure in chamber 44 is reduced below 20 inches Hg vacuum the link 57 will be moved downwardly below the position thereof shown in FIGURE 3 to raise the valve member 54 off of the valve seat 58, thus communicating the chamber 44 with the atmosphere until the pressure in chamber 44 again balances the load of the spring 71, that is, until the pressure in chamber 44 is 20 inches Hg vacuum.

The vacuum motor 21 may be adapted to become operative, that is, to begin to depress the brake pedal 14 at any given pressure, say for example, at a pressure less than 10 inches Hg vacuum. Thus when the only force acting on the link 57 is due to the preload of the spring 71 and the pressure in the chamber 44, the vacuum motor will be subjected to a vacuum of about 20" Hg and the brake pedal 14 will be fully depressed to exert maximum braking.

Actuation of the thumb operated rheostat 23, however, to cause current to pass through the windings of coil 67 will have the effect of exerting a magnetic force on the sole plate 70 downwardly toward the windings 67 and in opposition to preload of the spring 71. Thus the overall upward force acting on the link 57 will be reduced to move it downwardly.

This downward movement of the link 57 has the effect of raising the upper valve member 54 off of its valve seat 58, thereby communicating chamber 44 with atmosphere to raise the pressure therein until once again the vacuum in chamber 44 acting on the diaphragm 60 balances the reduced upward force on link 57. When this is accomplished the link 57 will rise slightly to again seat the upper valve member 54 on the valve seat 58.

This reduction in vacuum (rise in pressure) in chamber 44 has the effect of reducing the vacuum acting on the movable member or diaphragm 28 of the vacuum motor 24, thus reducing the force acting on the brake pedal 14 and reducing the braking effect on the vehicle.

Assume that the braking effect is to be increased. The thumb operated rheostat 23 is then actuated or moved in an opposite direction to decrease the current through windings 67. The downward force of sole plate 70 acting on link 57 is then reduced and the spring 71 raises the link 57. This rise has the effect of raising the lower valve member 51 off of its valve seat 53 to communicate chamber 44 with the lower pressure of passage 49. When the reduced pressure in chamber 44 acting downwardly on the diaphragm 60 again balances the upward force applied by the spring 71 minus the downward force of the sole plate 70 the link 57 will move downwardly to again seat the lower valve member 51 on the valve seat 53.

In raising and lowering the pressure in chamber 44 to operate the vacuum motor 21 in accordance with actuation of the rheostat 23 there may exist a slight "bunting" of the upper and lower valve mambers 54 and 51 to balance the upward force of the spring 71 minus the downward force of the sole plate 70. Such bunting is only minimal, however, and has no significant effect in maintaining a substantially constant vacuum conditions in chamber 44 except, of course, when the thumb operated control member 23 is being manipulated to vary the vacuum. The braking effect is smooth, the modulator is fast-acting and the change in vacuum is immediate.

In the illustrated embodiment an increase in braking effect occurs as current passing through the windings 67 is reduced. Accordingly maximum current passes through windings 67 when no braking effect is sought, and minimum current is applied when maximum braking is sought.

By rearrangement of parts the operation of the system could be changed whereby maximum braking would be effected with maximum current flow, as will be understood by those skilled in the art. The illustrated embodiment, however, offers the advantage of braking the vehicle upon loss of electric power occasioned, for example, by a loose electrical connection, thus making the vehicle operator aware of the difficulty.

Of course, the control member 23 may be located in positions other than directly on the steering wheel itself. In FIG. 2, for example, another embodiment of the control member indicated at reference numeral 23a comprises a shaft 80 pivotally mounted on the steering column 11 for varying the resistance in the windings of a rheostat 81. The shaft 80 may be manipulated by the vehicle operated to brake the vehicle in much the same manner as the gear shift lever of a manual transmission is manipulated. The shaft 80 may be spring biased to return to a non-braking position upon its release.

Although minor modifications might be suggested by those versed in the art, it should be understood that we wish to embody within the scope of the patent warranted hereon all such modifications as reasonably come within the scope of our contribution to the art.

We claim as our invention:

1. A vacuum operated brake system for use in a vehicle having a vacuum system and a brake system including a depressible brake pedal comprising,
    a vacuum motor having a linkage movable in response to variations in vacuum to which the vacuum motor is subjected and adapted for connection to the brake pedal to operate the pedal in a manner similar to the foot operation thereof by the operator of the vehicle,
    an electro-mechanical transducer comprising a vacuum modulator and electrically operable means for operating the vacuum modulator,
        said vacuum modulator comprising a vacuum inlet for connection to the vacuum system of the vehicle, a vacuum outlet for connection to said vacuum motor and adjustable means for varying the pressure between said inlet and said outlet,
        said electrically operable means being operatively connected to said adjustable means for operation thereof as a function of changes in electrical power supplied to said electrically operable means, and
    electric circuit means connected to said electrically operable means and comprising a manually operated control means for varying the power supplied to said electrically operable means.

2. The vacuum operated brake system as defined in claim 1 wherein said manually operated control means comprises a current regulating rheostat.

3. The vacuum operated brake system as defined in claim 1 wherein said vacuum motor is adapted to increase the braking effect of the brake pedal as the vacuum to the vacuum motor increases.

4. The vacuum operated brake system as defined in claim 1 wherein said transducer and said vacuum motor are arranged to increase the braking effect of the vehicle as the current through the electrically operable means decreases.

5. The vacuum operated brake system as defined in claim 2 wherein said rheostat comprises an actuator arm adapted to be located in the vehicle so as to be within arm reaching distance of the operator of the vehicle.

6. The vacuum operated brake system as defined in claim 1 wherein,
    said vacuum modulator comprises relatively movable valve members and valve seats, and
    said electrically operable means comprises means for moving said valve members into and out of seating engagement with said valve seats.

7. The vacuum operated brake system as defined in claim 1 wherein said vacuum motor further comprises,
an elongated housing closed at one end thereof and open to atmosphere at the other end,
a motive member movably carried in said housing to form a leakproof vacuum chamber in said housing,
means biasing the motive member to the open end of the housing,
means forming a vacuum port in said housing for communicating said chamber and said outlet of said vacuum modulator, and
means interconnecting said motive member and said linkage for joint movement therewith and with the brake pedal.

References Cited
UNITED STATES PATENTS

| | | | |
|---|---|---|---|
| 1,856,635 | 5/1932 | Herren | 303—12 |
| 2,057,707 | 10/1936 | Carroll | 303—4 X |
| 2,477,468 | 7/1949 | Shelton | 188—152 |

DUANE A. REGER, *Primary Examiner.*

U.S. Cl. X.R.

60—60; 188—152; 303—4